United States Patent Office 2,836,608
Patented May 27, 1958

2,836,608

SYNTHESIS OF STEROIDS

Josef Fried, New Brunswick, Richard W. Thoma, Somerville, David Perlman, Princeton, and John R. Gerke, Franklin Township, N. J., assignors to Olin Mathieson Chemical Corporation, New York, N. Y., a corporation of Virginia No Drawing. Application May 27, 1955
Serial No. 511,784

12 Claims. (Cl. 260—397.4)

This application is a continuaton-in-part of our co-pending application, Serial Number 372,798, filed August 6, 1953, now Patent No. 2,753,290, issued July 3, 1956.

This invention relates to the synthesis of valuable steroids.

One object of this invention is the provision of steroids of the progesterone series having a 7α-hydroxy or 7α-acyloxy group, which compounds are useful for their own physiological action.

The compounds of this invention comprise 7α-hydroxy-progesterone and the carboxylic acid esters thereof. The preparation of the 7α-hydroxyprogesterone of this invention by the micro-biological oxidation of progesterone is disclosed in our Patent No. 2,753,290. The carboxylic acid esters of 7α-hydroxyprogesterone of this invention are preferably prepared from the free hydroxy derivative by reacting the latter with an acylating agent such as a carbonyl halide or carboxylic acid anhydride as more fully disclosed hereinafter.

Among the compounds of this invention are those of the general formula

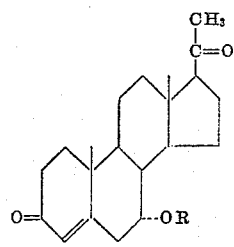

wherein R is hydrogen or an organic carbonyl radical. Suitable organic carbonyl radicals include the aliphatic carbonyl radicals, such as the alkanoyl radicals (e. g., lower alkanoyl radicals, such as acetyl, propionyl, butyryl, valeryl, caproyl, and enanthoyl), aroyl radicals (e. g., aromatic hydrocarbon carbonyl radicals, such as benzoyl and naphthoyl), cycloalkanoyl radicals (e. g., hexahydrobenzoyl), aralkanoyl radicals (e. g., α-toloyl and β-phenylpropionyl), and heterocyclic carbonyl radicals (e. g., nicotinoyl, furoyl, and 2-thiophenecarbonyl). The preferred organic carbonyl radicals, however, are those of hydrocarbon carboxylic acids having less than ten carbon atoms, the lower alkanoyls being particularly preferred.

To prepare the steroids of this invention, progesterone is subjected to the action of the enzymes of a microorganism such as Phycomyces blakesleeanus (Department of Biological Sciences, Purdue University) in an aqueous medium containing a source of nitrogenous factors and an assimilable source of carbon and energy, in the presence of oxygen, and the 7α-hydroxyprogesterone formed is then recovered. This method is more fully detailed in said Patent No. 2,753,290, and in the example following.

The 7α-hydroxyprogesterone thus formed can then be acylated by reacting the 7α-hydroxy steroid with an acylating agent such as a carbonyl halide or a carboxylic acid anhydride in the presence of a basic agent. Suitable carbonyl halides include the aliphatic carbonyl halides, such as the alkanoyl chlorides (e. g., a lower alkanoyl chloride, such as acetyl chloride, propionyl chloride, butyryl chloride, valeryl chloride, caproyl chloride, and enanthoyl chloride), aroyl chlorides (e. g., benzoyl chloride and naphthoyl chloride), cycloalkanoyl chlorides (e. g., hexahydrobenzoyl chloride), aralkanoyl chlorides (e. g., α-toluyl chloride and β-phenylpropionyl chloride), and heterocyclic carbonyl chlorides (e. g. nicotinoyl chloride, furoyl chloride, and 2-thiophenecarbonyl chloride). The preferred carbonyl halides are the hydrocarbon carbonyl chlorides having less than ten carbon atoms, the lower alkanoyl chlorides being particularly preferred. Suitable carboxylic acid anhydrides include the aliphatic carboxylic acid anhydrides, such as the alkanoic anhydrides (e. g., lower alkanoic anhydrides such as acetic anhydride, propionic anhydride, butyric anhydride, valeric anhydride, caproic anhydride, and enanthic anhydride), aromatic carboxylic acid anhydrides (e. g., benzoic anhydride and naphthoic anhydride), cycloalkanoic anhydrides (e. g., hexahydrobenzoic anhydride), aralkanoic anhydrides (e. g., α-toluic anhydride and β-phenyl-acetic anhydride) and heterocyclic carboxylic acid anhydrides (e. g., nicotinic anhydride, furoic anhydride, and 2-thiophenecarboxylic anhydride). The preferred carboxylic acid anhydrides are the hydrocarbon carboxylic acid anhydrides having less than nineteen carbon atoms, the lower alkanoic anhydrides being particularly preferred. Suitable basic agents are organic bases (e. g. pyridine and collidine) and inorganic bases (e. g the alkali salts of lower fatty acids). The acylating reaction is conducted either with an organic base serving as a solvent or in an inert organic solvent such as chloroform, using at least a stoichiometric amount of acylating agent.

The carboxylic acid esters of 7α-hydroxyprogesterone of this invention are active materials which possess progestational activity. Thus, the new steroids of this invention can be administered instead of, and in the same manner as, progesterone in the treatment of functional uterine bleeding and amenorrhea. The dosage for such administration is of course dependent on the relative activity of the particular ester and progesterone. The 7α-hydroxyprogesterone is also a utilizable intermediate in the preparation of the known steroid, Δ⁶-dehydroprogesterone, as disclosed in Patent No. 2,753,290, and hereinafter.

The following examples are illustrative of the invention (all temperatures being in centigrade):

EXAMPLE 1

7α-hydroxyprogesterone (a) FERMENTATION

A medium of the following composition is prepared:

| | G. |
|---|---|
| Cornsteep liquor solids | 3 |
| $NH_4H_2PO_4$ | 3 |
| $CaCO_3$ | 2.5 |
| Soybean oil | 2.2 |
| Progesterone | 0.50 |

Distilled water to make one liter.

The pH of the medium is adjusted to 7.0±0.1 (with sodium hydroxide solution); and 100 ml. portions of the medium are distributed in 500 ml. Erlenmeyer flasks, and the flasks plugged with cotton and sterilized by autoclaving for 30 minutes at 120°. When cool, each of the flasks is inoculated with 5–10% of a vegetative inoculum of Phycomyces blakesleeanus. The flasks are mechanically shaken for 72 hours in a room maintained at 25°; and the contents of the flasks are pooled, adjusted to pH 4.0±0.2 with sulfuric acid, and filtered by suction through Seitz filter pads. [The vegetative inoculum used is grown from stock cultures (lyophilized vial or agar slant) for 24-72 hours (with or without successive 24-72 hour periods) in a medium of the following composition: 15 g. cornsteep liquor solids; 10 g. brown sugar; 6 g. $NaNO_3$; 0.001 g. $ZnSO_4$; 1.5 g. anhydrous $KH_2PO_4$; 0.5 g. $MgSO_4 \cdot 7H_2O$; 5 g. $CaCO_3$; 2 g. lard oil; and distilled water to make one liter, the medium being sterilized by autoclaving for 30 minutes at 120°.]

(b) ISOLATION OF THE 15β-HYDROXYPROGESTERONE AND THE 7α-HYDROXYPROGESTERONE FORMED 9 liters of a culture filtrate obtained as described in (a) by fermentation of 4.85 g. progesterone is extracted with six 2-liter portions of chloroform. The combined chloroform extract is filtered, and evaporated to dryness in vacuo. The residue, weighing about 1.31 g., is taken up in 25 ml. 80% aqueous methanol, and the resulting solution extracted with five 25 ml. portions of hexane. The methanol solution is then evaporated to dryness, and the residue (weighing about 1.023 g.) is dissolved with warming in 1 ml. of chloroform and 4 ml. of benzene. The resulting solution is chromatographed on 20 g. of sulfuric acid-washed alumina. Elution with 400 ml. of a mixture of 1 part of chloroform and 4 parts of benzene yields about 470 mg. of a 15β-hydroxyprogesterone, which after recrystallization from acetone melts at about 204-205° C., $[\alpha]_D^{22} + 151°$ (c, 0.98 in $CHCl_3$);

$\lambda_{max}^{alc.}$ 241 m$\mu$ ($\epsilon$=15,800); $\lambda_{max}^{Nujol}$ 2.96 $\mu$ (OH)

5.90 $\mu$ (sat. CO); 6.06 $\mu$ (conj. CO); 6.19 $\mu$ (conj. double bond).

*Analysis.*—Calcd. for $C_{21}H_{30}O_3$: C, 76.33; H, 9.15. Found: C, 76.31; H, 8.90.

Subsequent elution of the column with equal volumes of benzene-chloroform yields in the first 175 ml. mixed products, and in the subsequent 800 ml. about 175 mg. of 7α-hydroxyprogesterone. The latter, after two crystallizations from acetone, melts at about 229-230°, $[\alpha]_D^{22} + 167°$ (c, 0.99 in $CHCl_3$), $\lambda_{max}^{alc.}$ 241 m$\mu$ ($\epsilon$=15,300), $\lambda_{max.\ after\ 24\ hours}^{2.5\%\ KOH\ in\ MeOH}$ 283 m$\mu$ ($\epsilon$=23,100), $\lambda_{max}^{Nujol}$ 3.03 $\mu$ (OH)

5.88 $\mu$ (20-keto); 6.06 $\mu$; 6.22 $\mu$ ($\Delta^4$-3-keto).

*Analysis.*—Calcd. for $C_{21}H_{30}O_3$: C, 76.33; H, 9.15. Found: C, 76.33; H, 9.25.

EXAMPLE 2

$\Delta^6$-*dehydroprogesterone*

A solution of 15 mg. of the 7α-hydroxyprogesterone obtained as described in section (b) of Example 1, in 5 ml. of 2.5% KOH in methanol, is refluxed for one hour. After cooling, 5 ml. water is added, and the methanol is removed in vacuo. The aqueous residue is extracted with chloroform, and the chloroform solution washed with water. After drying over sodium sulfate, the solvent is removed in vacuo, and the residue (weighing about 12.0 mg.) is dissolved in 0.25 ml. of benzene and 1 ml. of hexane for chromatography on alumina (250 mg.). Elution of the alumina column with benzene-hexane (1:4) yields a crystalline material, which after two recrystallizations melts at about 133-137°, $\lambda_{max}^{alc.}$ 283 m$\mu$ (28,000)

Infrared comparison with an authentic sample of $\Delta^6$-dehydroprogesterone (M. P. 145-146°) shows these two products to be identical.

EXAMPLE 3

*7α-hydroxyprogesterone acetate*

25 mg. of 7α-hydroxyprogesterone (M. P. 227-288°) is acetylated with 1 ml. of pyridine and 1 ml. of acetic anhydride for 18 hours at room temperature. After removal of the reagents in high vacuum the crystalline residue is recrystallized from acetone. Pure 7α-hydroxyprogesterone acetate has the following properties, M. P. about 237-238°, $[\alpha]_D^{23} + 71°$ (c, 1.0 in chloroform);

$\lambda_{max}^{alc.}$ 237 m$\mu$ ($\epsilon$=17,700)

*Analysis.*—Calcd. for $C_{23}H_{32}O_4$ (372.49): C, 74.16; H, 8.66. C, 74.54; H, 8.57.

EXAMPLE 4

*7α-hydroxyprogesterone enanthate*

Following the procedure of Example 3 but substituting 0.01 ml. of n-heptanoic anhydride for the acetic anhydride, 7α-hydroxyprogesterone enanthate is formed.

EXAMPLE 5

*7α-hydroxyprogesterone benzoate*

If 0.02 ml. of benzoyl chloride is substituted for the acetic anhydride in Example 3, 7α-hydroxyprogesterone benzoate is produced.

In a similar manner, other esters of 7α-hydroxyprogesterone can be prepared. Thus, if other lower alkanoic anhydrides, such as propionic anhydride, butyric anhydride, and valeric anhydride, are substituted for the acetic anhydride of Example 3, the corresponding lower alkanoic esters, such as the propionate, butyrate, and valerate, are produced.

The invention may be variously otherwise embodied within the scope of the appended claims.

We claim:

1. A steroid selected from the group consisting of 7α-hydroxyprogesterone and hydrocarbon carboxylic acid esters thereof, wherein the acid moiety contains less than ten carbon atoms.
2. 7α-hydroxyprogesterone.
3. A hydrocarbon carboxylic acid ester of 7α-hydroxyprogesterone, wherein the acid moiety contains less than ten carbon atoms.
4. A lower alkanoic acid ester of 7α-hydroxyprogesterone.
5. 7α-hydroxyprogesterone acetate.
6. 7α-hydroxyprogesterone enanthate.
7. 7α-hydroxyprogesterone benzoate.
8. The process for preparing esters of 7α-hydroxyprogesterone, which comprises reacting, in the presence of a basic medium, 7α-hydroxyprogesterone with an acylating agent selected from the group consisting of a carbonyl halide of a hydrocarbon carboxylic acid containing less than ten carbon atoms and a carboxylic acid anhydride of a hydrocarbon carboxylic acid containing less than ten carbon atoms, and recovering the ester thus formed.
9. The process of claim 8 wherein the acylating agent is a lower alkanoic anhydride.
10. The process of claim 8 wherein the acylating agent is acetic anhydride.
11. The process of claim 8 wherein the acylating agent is n-heptanoic anhydride.
12. The process of claim 8 wherein the acylating agent is benzoyl chloride.

References Cited in the file of this patent

UNITED STATES PATENTS 2,602,769    Murray _____ July 8, 1952

OTHER REFERENCES

Ehrenstein, Jour. Org. Chem. 5, 318-28 (1940).
Balant, Jour. Org. Chem. 17, 1587-96 (1952).
Sondheimer, Experientia 9, 62-63 (1953).